(No Model.) 2 Sheets—Sheet 2.
O. B. SHALLENBERGER & H. M. BYLLESBY.
CENTRAL STATION FOR ALTERNATE CURRENT SYSTEMS OF ELECTRICAL DISTRIBUTION.
No. 380,946. Patented Apr. 10, 1888.
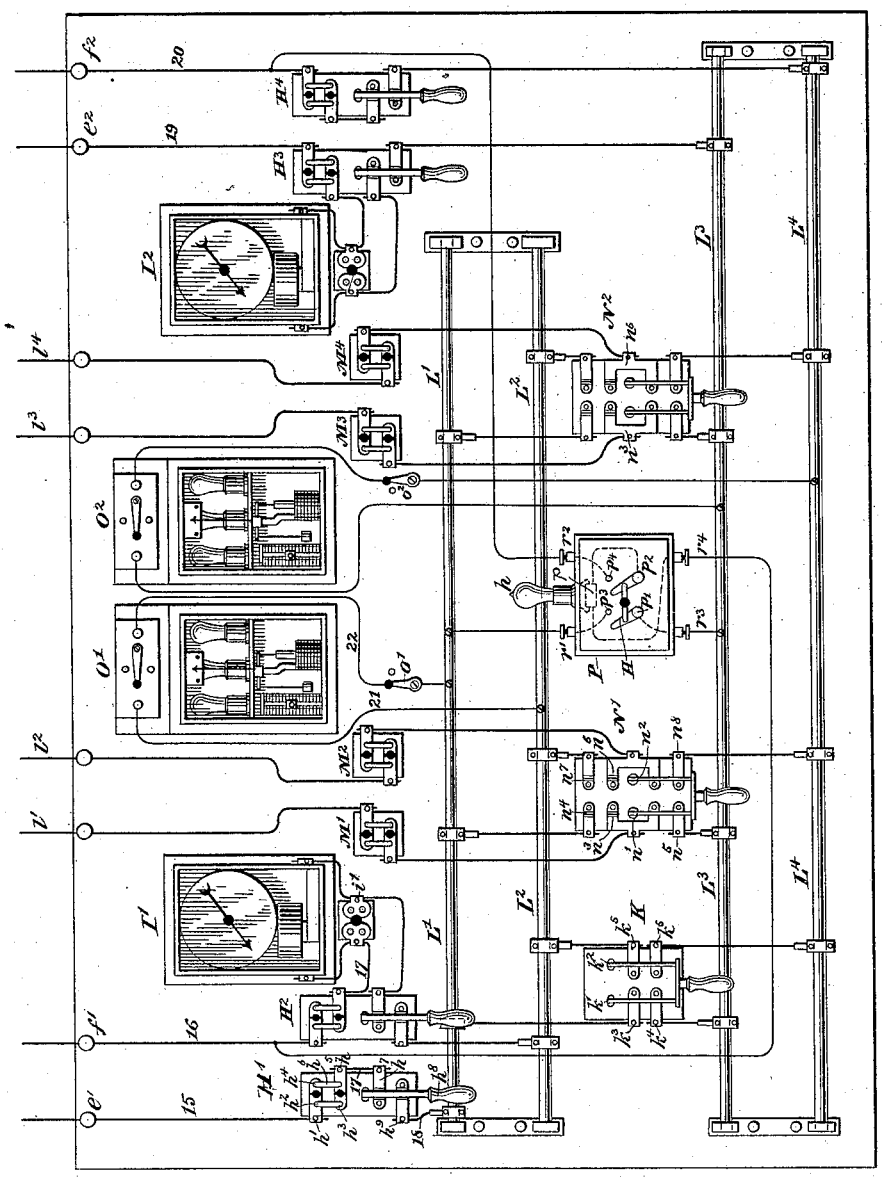

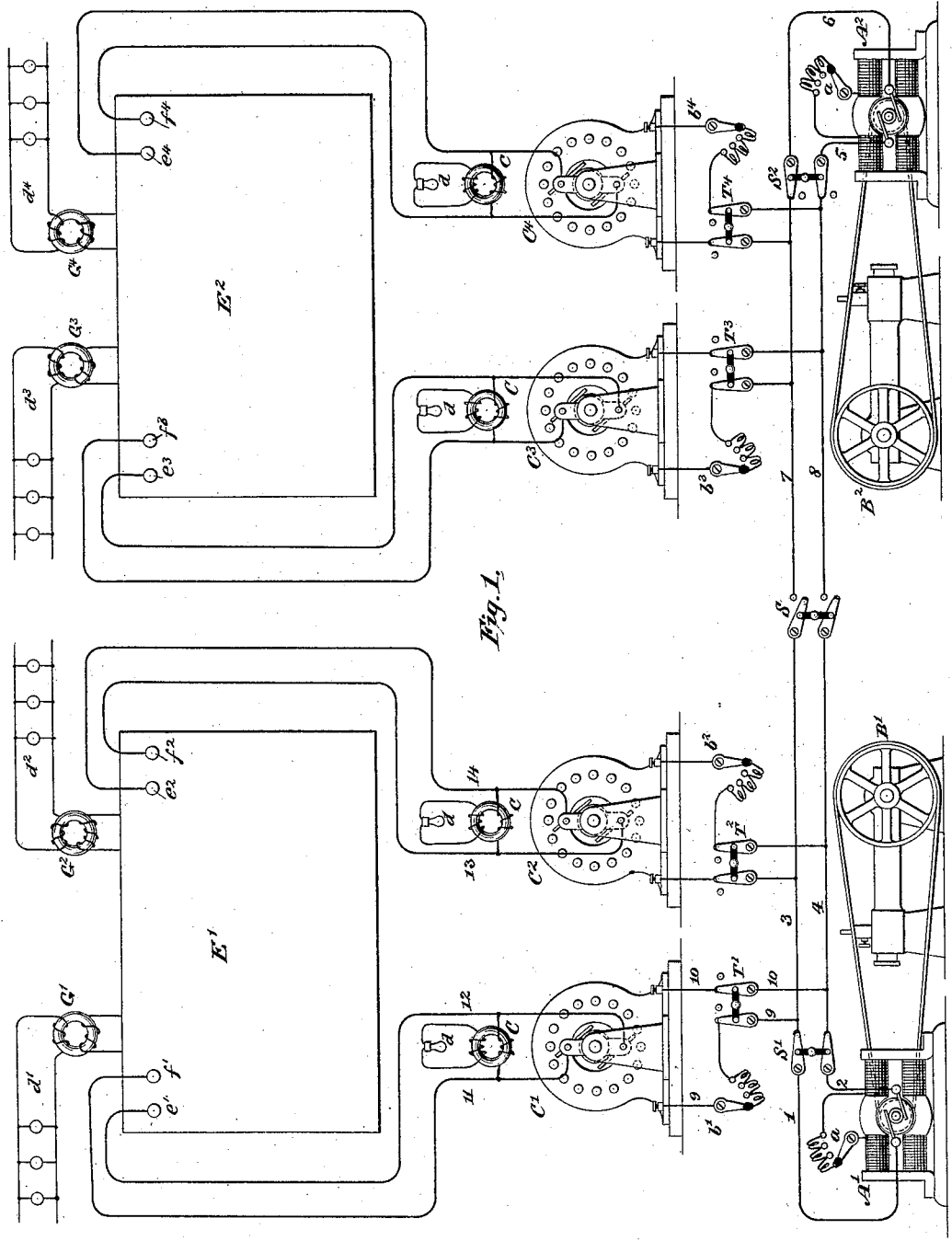

UNITED STATES PATENT OFFICE.

OLIVER B. SHALLENBERGER, OF ROCHESTER, AND HENRY M. BYLLESBY, OF PITTSBURG, ASSIGNORS TO THE WESTINGHOUSE ELECTRIC COMPANY, OF PITTSBURG, PENNSYLVANIA.

CENTRAL STATION FOR ALTERNATE-CURRENT SYSTEMS OF ELECTRICAL DISTRIBUTION.

SPECIFICATION forming part of Letters Patent No. 380,946, dated April 10, 1888.

Application filed January 21, 1888. Serial No. 261,456. (No model.)

*To all whom it may concern:*

Be it known that we, OLIVER B. SHALLENBERGER and HENRY M. BYLLESBY, citizens of the United States, residing, respectively, in Rochester, Beaver county, and in Pittsburg, Allegheny county, both in the State of Pennsylvania, have jointly invented certain new and useful Improvements in Central Stations for Alternate-Current Systems of Electrical Distribution, (Case No. 141,) of which the following is a specification.

The invention relates to an organization of circuits and apparatus at the central station of a system of distribution employing alternating, intermittent, or pulsatory electric currents.

The invention consists, generally, in organizing apparatus in substantially the following manner: A suitable number of dynamo-electric generators are employed—say four. These have their field-magnets supplied by currents from two separate exciters, each provided with its own driving-engine. The field-magnets are connected in multiple arc with their respective exciters, and the generators are independently regulated. The exciters may be of such capacity that either one may serve to supply the currents necessary for the entire system of alternate current generators. Suitable switch and circuit controlling devices are employed for connecting the exciting devices in multiple arc with each other for the purpose of supplanting either one by the other. The several alternate-current generators are connected with their work-circuits in multiple arc or parallel circuit, and each has its own ammeter and voltmeter for determining the current. Each alternate-current generator is provided with a switch, whereby it may be thrown into and out of circuit, and each has a double-pole or two-way switch for connecting with either of two sets of feeders or main lines. Preferably, also, each generator is provided with a single light connected in the secondary circuit of a converter, the primary of which is connected across the poles of the generator, and this light is used as an indicator or pilot light. The distributing-wires leading to the work-circuits are connected with the trunk-wires through suitable double-pole switches.

In the accompanying drawings there is shown in Figure 1 an organization of circuits and apparatus adapted to carry out the invention, and in Fig. 2 a detail of the switch-board.

Referring to the figures, A' and A² represent two continuous-current generators driven, respectively, by engines B' and B², of any suitable character, and each generator is provided with an adjustable resistance, $a$, by means of which the current from the generator may be regulated. The respective poles of the generator A' are connected by conductors 1 and 2, through a switch, S', with conductors 3 and 4, respectively. The poles of the generator A² are connected by conductors 5 and 6, through a switch, S², with the conductors 7 and 8, respectively. The conductors 3 and 7 and 4 and 8 may be connected with each other by means of a switch, S, thus placing the two generators in circuit with each other when it is so desired. It will be understood that the poles of the generators are such that like currents will combine in the conductors.

Four alternate-current electric generators, C' C² C³ C⁴, are shown as applied to this system. The alternate-current generator C' has its field-magnet coils connected through a switch, T', by conductors 9 and 10, with the conductors 3 and 4, respectively. These connections may be interrupted by moving the switch T'. In like manner the field-magnet coils of the alternate-current electric generator C² are connected with the conductors 3 and 4 through a switch, T². The generators C³ and C⁴ have their field-magnet coils connected with the conductors 7 and 8 through switches T³ and T⁴, respectively. It will be seen thus that if the switch S be open and the switch S' closed, as also the switches T' and T², the field-magnet coils of the generators C' and C² will be connected in multiple arc with the exciter A'. By opening the switch T' or T² the corresponding generator will be cut out of circuit, and by opening the switch S' both generators will be disconnected. In like manner the connections between the exciter A² and generators C³ and C⁴ may be controlled, and in each instance the strength of current from the exciters may be regulated by the resistances $a$ and $a'$. In case it is desired, either exciter may be employed for supplying the field-magnet coils of all the generators C' C² C³ C⁴. This is accomplished by closing the switch S and then opening the switch S' or S². In this manner either exciter which is at any time in operation will be first connected in multiple arc with the other by means of the switch S, and then the original exciter dropped out of circuit by opening the corresponding switch S' or S², without interrupting the operation of the system.

The generator C' has its respective poles connected by conductors 11 and 12 with binding-posts e' and f' upon a switch-board, E'. The generator C² has its respective poles connected by conductors 13 and 14 with binding-posts e² and f² upon that switch-board, and in like manner the two generators C³ and C⁴ have their poles connected with binding-posts e³ f³ and e⁴ f⁴ upon a switch-board, E². The connections from these several binding-posts are controlled by means of the apparatus upon the respective switch-boards, presently to be described.

For the purpose of determining the current delivered by the several generators, each is supplied with a converter, C, the primary coil of which is connected between conductors leading from its respective poles, as shown, and the secondary coil includes in its circuit an indicating device, such as a single incandescent electric lamp, d. This serves as a pilot-light for indicating the operation of the corresponding machine.

Referring now particularly to Fig. 2, each switch-board E' and E² is constructed in the following manner: The posts e' and f' are connected by conductors 15 and 16 with dynamo-switches H' and H², respectively. These are alike, and but one need be described in detail. The conductor 15 leads to an insulating coupling-post, $h'$. This is connected by a fusible strip, $h²$, with a second coupling-plate, $h³$. The plates $h'$ and $h³$ are respectively provided with coupling-plates $h⁴$ and $h⁵$, in connection with which they may be placed by suitable switch-plugs. The plates $h⁴$ and $h⁵$ are connected through a fusible strip, $h⁶$. If, therefore, the circuit is closed through the strip $h²$ and plates $h³$ and $h⁵$, and this strip be burned out, then the plates $h'$ and $h⁴$ may be connected, and the circuit thus completed through the strip $h⁶$. The plate $h⁵$ is connected by the conductor 17 with a switch-plate, $h⁷$, applied to a lever, $h⁸$, which is adapted to be placed in connection with the plate $h⁷$, and at the same time with a second switch-plate, $h⁹$. This latter is connected by conductor 18 with trunk line L'. By opening the switch-lever $h⁸$ these connections are interrupted. The connections are made in like manner from the conductor 16 through the dynamo-switch H² to the trunk line L². In this switch the conductor 17, however, includes in its circuit an ammeter, I', of convenient construction. This may be cut out of circuit when desired by a short circuiting-switch, $i'$. The binding-post $e²$ and $f²$ are in like manner connected by conductors 19 and 20, through dynamo-switches H³ and H⁴, to the trunk lines L³ and L⁴. An ammeter, I², is applied to the switch H³.

For the purpose of connecting the lines L' and L² with the lines L³ and L⁴ when it is desired, a switch, K, is employed. This consists of two levers, $k'$ and $k²$, insulated from each other and each provided with two contact-plates, $k³$ $k⁴$ and $k⁵$ $k⁶$. The plate $k³$ is connected with the line L' and the plate $k⁴$ with the line L³. The plates $k⁵$ and $k⁶$ are respectively connected with the lines L² and L⁴. By closing the switch-levers, therefore, the line L' will be connected with the line L³ and the line L² with the line L⁴.

The connections are made from the lines L' L² L³ L⁴ with the outgoing conductors $l'$, $l²$, $l³$, and $l⁴$ by means of double-pole switches N' and N². These switches are alike, and each has two insulated levers, $n'$ and $n²$, each provided with three contact-plates, $n³$ $n⁴$ $n⁵$ and $n⁶$ $n⁷$ $n⁸$, respectively. When the levers are in one position, the plate $n³$ is connected with the plate $n⁴$ and the plate $n⁶$ with the plate $n⁸$. When the lever is thrown over, the connections are made from the plates $n³$ and $n⁶$ with the plates $n⁴$ and $n⁷$, respectively.

The plates $n³$ and $n⁶$ of the switch N' are respectively connected through fusible cut-outs M' M² with the lines $l'$ and $l²$, and the plates $n³$ and $n⁶$ of the switch N² are connected through fusible cut-outs M³ and M⁴ with the lines $l³$ and $l⁴$. The plates $n⁴$ and $n⁷$ of each switch N' and N² are respectively connected with the conductors L' and L², and the plates $n⁵$ and $n⁸$ of these switches are respectively connected with the lines L³ and L⁴. When, therefore, the switches are in the position shown, the conductors 15 and 16 are connected with the trunk lines L' and L², and these trunk lines are further connected with the lines L³ and L⁴, respectively. The conductors 19 and 20 are also connected with the lines L³ and L⁴. The lines $l'$ $l²$ and $l³$ $l⁴$ are thus fed by the currents from both trunk lines. By opening the switch N' the lines $l'$ $l²$ will be disconnected. By opening the switch K the trunk-lines L' L² will be disconnected from the lines L³ and L⁴. If then the switch N' be closed upon the upper contacts, the lines $l'$ $l²$ will be fed from the lines L' and L², and likewise the lines $l³$ and $l⁴$ will be supplied from the lines L³ and L⁴ alone. By opening the switch N² the lines $l³$ and $l⁴$ will be disconnected. By closing it upon the upper contacts these latter will be fed from the trunk lines L' and L². In this manner the supply-conductors $l'$ $l²$ and $l³$ $l⁴$ may be connected with either dynamo C' C² alone, or all fed jointly from the two.

The lines $l'$ and $l²$ are shown in Fig. 1 as leading to a converter, G', the secondary coil of which is connected through translating devices $d'$, &c. In like manner the conductors $l³$ $l⁴$, $l⁵$ $l⁶$, and $l⁷$ $l⁸$ are connected through converters G² G³ G⁴, feeding translating devices $d²$ $d³$ $d⁴$. The organization of the outside circuits may be variously modified.

Each pair of main trunk lines is provided with a voltmeter, as shown at O' and O². These may be of any convenient construction. The voltmeter O' may be connected in circuit at will across the conductors L' and L² by means of conductors 21 and 22, including a switch, o', and the voltmeter O² may be connected between the conductors L³ and L⁴ through a switch, o².

For the purpose of insuring that the generators connected with the lines L' and L² and L³ L⁴ are in synchronism or unison with each other when they are to be connected in parallel, a synchronizing device, P, is employed. This device consists of an electric converter the secondary coil of which is connected with an incandescent lamp, h, while its primary coil is connected between two switch-arms, p' and p². The respective points of these arms, p³ and p⁴, are connected with binding-plates r' and r². The points r' and r² are respectively connected with the line L' and the conductor 20, leading to the binding-post f². The switch-arms p' and p² are connected with the binding-posts r³ and r⁴, respectively. The conductor leading from the arm p² includes the primary coil of the converter p. The posts r³ and r⁴ are respectively connected with the line L³ and the conductor 16, leading to the binding-post f'. When the switch H is closed, the trunk lines L' and L³ are connected with each other, and the conductors 16 and 20 are connected with each other through the primary coil of the converter p. Thus the lamp h will be operated by the resultant currents derived from the two pairs of conductors, and the variations in its brilliancy will indicate the relations of the phases of the currents and the proper moment for connecting the generators in multiple arc.

I claim as my invention—

1. The combination, with two sources of electricity and terminal trunk-wires for the respective sources, of two systems of translating devices, means for placing either system in circuit with either pair of trunk-wires, and a switch for connecting said trunk-wires in parallel, substantially as described.

2. The combination, with two sources of electricity, two sets of terminals therefor, and means for placing the sources in connection therewith, of two systems of translating devices, switches for placing the same in connection with either set of terminals at will, a circuit-interrupting device for each pole of each source, a synchronizing device for indicating the currents from each source, and means for connecting the terminals of the respective sources at will.

3. The combination, with two sources of electricity and two systems of translating devices, of switches for placing either system in connection with either or both sources, a voltmeter, and means for placing the same in circuit between the terminals of the respective sources, substantially as described.

4. The combination, with the terminals L', L², L³, and L⁴, and the conductors l', l², l³, and l⁴, of the coupling-switch K, for connecting said terminals, and the double-pole switches N' and N², for connecting either pair of conductors at will, substantially as described.

5. The combination, with two sources of electricity and two systems of translating devices, of trunk-wires connected with the respective sources, switches for making or breaking such connections, a switch for placing said trunk-wires and thus the said sources in parallel circuit, and means for interrupting the circuit-connections of either system of translating devices.

In testimony whereof we have hereunto subscribed our names this 10th day of January, A. D. 1888.

OLIVER B. SHALLENBERGER.
HENRY M. BYLLESBY.

Witnesses:
   W. D. UPTEGRAFF,
   DANL. W. EDGECOMB.